Sept. 20, 1966  KAZUO HIYAMA ETAL  3,273,667
HARVESTING SCAFFOLD FOR ORCHARDS
Filed July 20, 1964  2 Sheets-Sheet 1
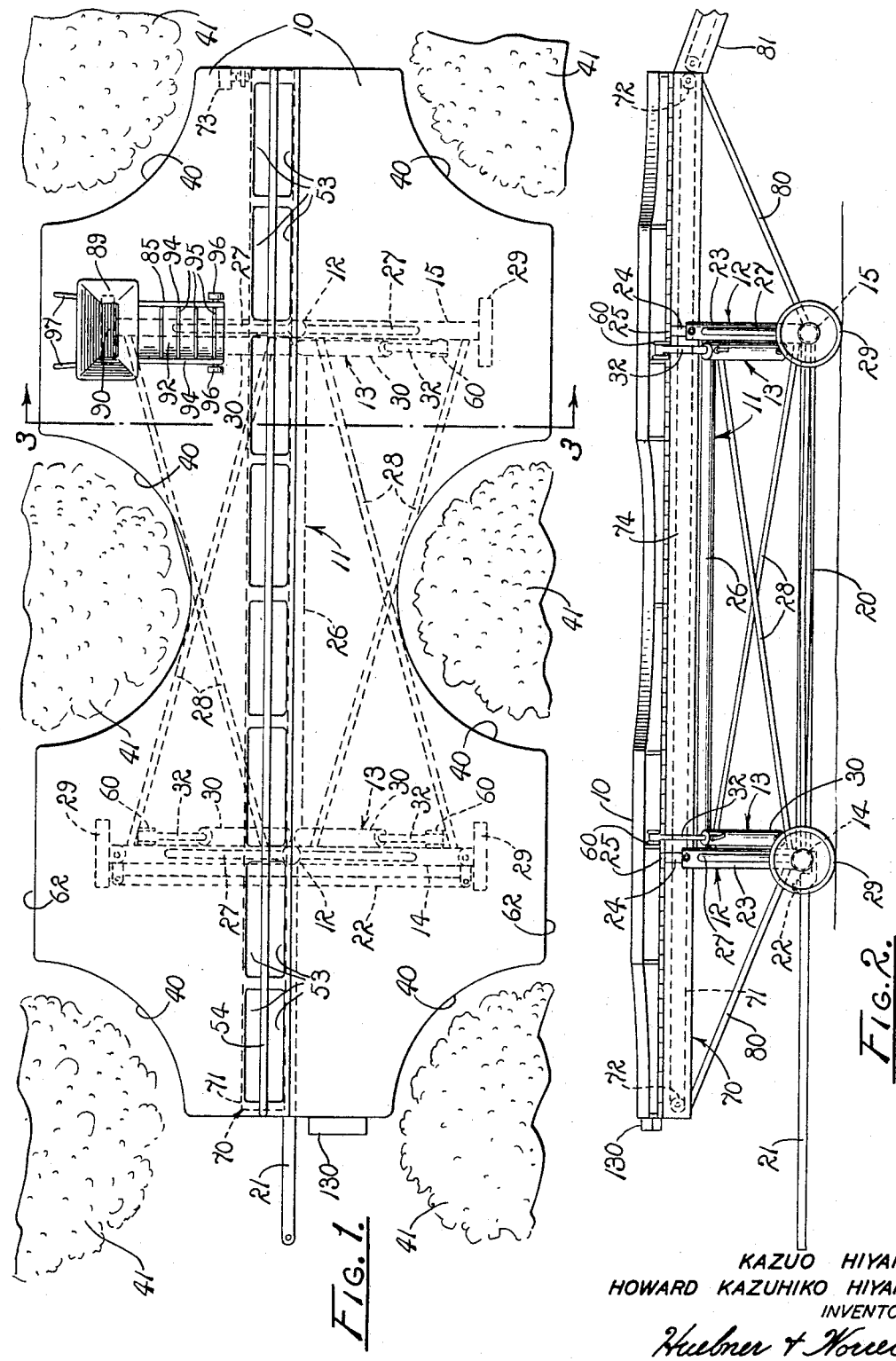
KAZUO HIYAMA
HOWARD KAZUHIKO HIYAMA
INVENTORS
Huebner & Worrel
ATTORNEYS

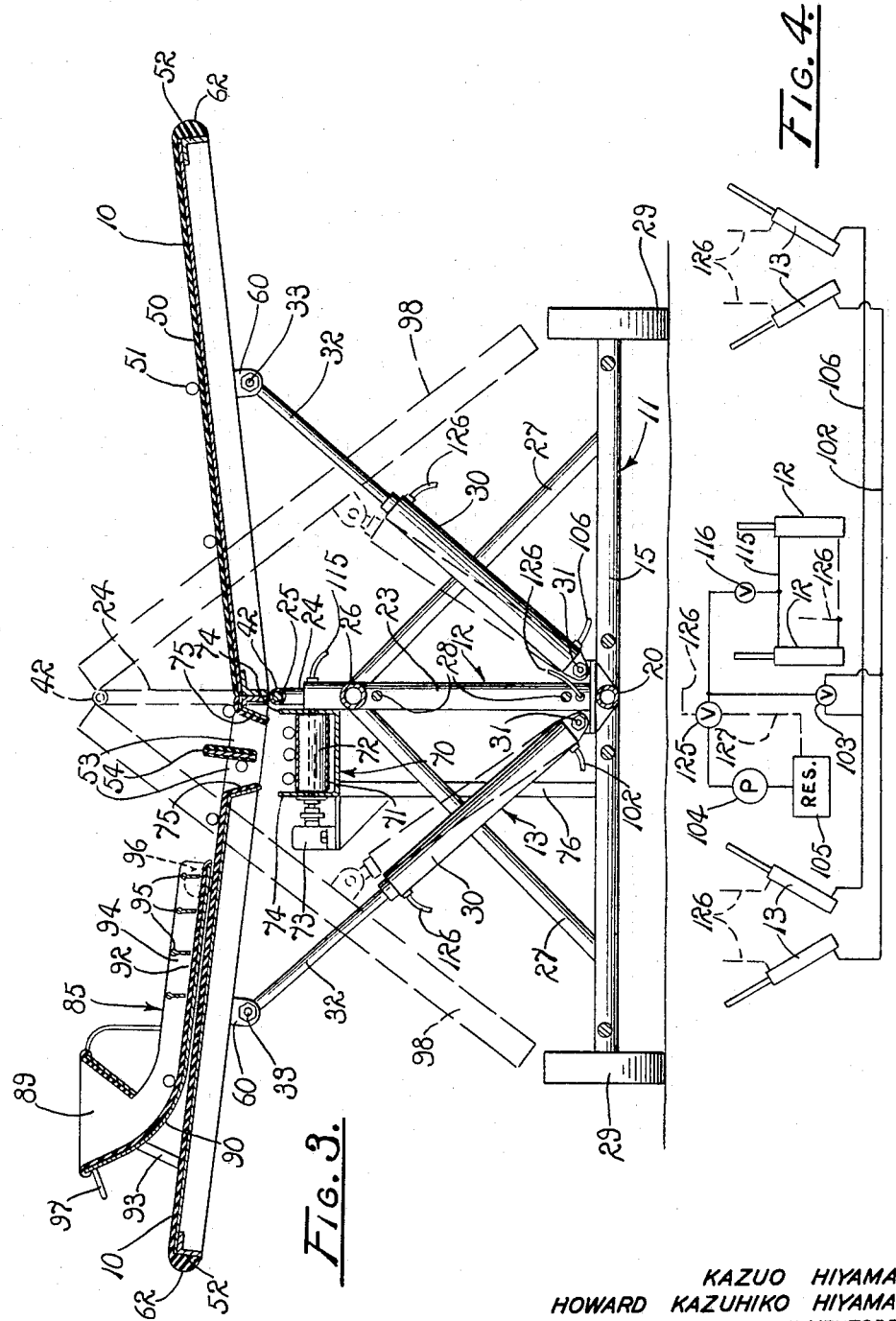

United States Patent Office 3,273,667
Patented Sept. 20, 1966

3,273,667
HARVESTING SCAFFOLD FOR ORCHARDS
Kazuo Hiyama and Howard Kazuhiko Hiyama, both of 8184 E. Adams, Fowler, Calif.
Filed July 20, 1964, Ser. No. 383,751
7 Claims. (Cl. 182—129)

The present invention relates to a harvesting scaffold for orchards and the like and more particularly to a mobile elevated harvesting scaffold adapted for adjustment between an extended position allowing gravitational collection of fruit and the like and a retracted folded position for transport.

The present invention has particular application in the harvest and care of orchards. Examples of previously known mobile scaffolds providing elevated work platforms for thinning, picking and gathering fruit in orchards as well as pruning the orchard trees and which is adapted to be folded into retracted positions facilitating movement between upright objects such as orchard trees are found in my prior U.S. Patent No. 3,129,786, issued April 21, 1964, and in my co-pending patent application Serial No. 215,687, filed August 8, 1962. The subject invention results from the realization that the efficient gathering of fruit by use of these devices would be even further enhanced by the provision of a feature allowing convenient deposit of picked fruit by workers and the subsequent mechanical conveyance of the fruit to a central collection station or conveyor. Such an operation would minimize or obviate the need for ladders, picking bags, buckets and the like utilized in conventional harvesting procedures as well as the excess time which they require.

Although the improved mobile scaffold of the present invention was designed specifically for use in the harvesting of fruit in orchards, the scaffold is also adapted to use in other types of elevated work near upright objects and for the collection of other objects or articles. For convenience, the description refers only to an orchard as an illustrative operational environment.

Accordingly, it is an object of the present invention to provide an improved mobile scaffold having an elevated work platform which is sloped so as to allow the gravitational descent of fruit or the like to a collection point or container.

Another object is to provide such an improved scaffold having a retractable platform for movement between an extended position for working along rows of trees and a retracted travel position in which the lateral dimensions are minimized to permit earth traversing movement between the rows.

Another object is to provide, in such a mobile scaffold having a foldable work platform of multiple sections, an improved mechanism to insure synchronous expeditious movement of the multiple sections.

Another object is to provide on such a retractable scaffold a centralized collection conveyor adapted gravitationally to receive fruit congregating from all portions of the platform surface.

Another object is to provide in such a mobile scaffold, a portable chute positionable on the platform for receiving fruit and gently directing its passage toward a central conveyor.

Other objects are to provide improved elements and arrangements thereof in a device of the character and for the purposes set forth.

A further object is to provide an improved, durable, economical, and fully effective harvesting platform.

Still further objects and advantages will become apparent in the subsequent description in the specification.

In the drawings:

FIG. 1 is a plan view of a mobile scaffold embodying the principles of the present invention.

FIG. 2 is a side elevation of the scaffold of FIG. 1.

FIG. 3 is a transverse vertical section taken along line 3—3 of FIG. 2 and showing the platforms in both the extended and the retracted positions.

FIG. 4 is a fragmentary schematic diagram of the hydraulic power system of the present invention.

Referring more particularly to the drawings, the scaffold consists generally of a pair of platforms or wings 10 supported on a mobile frame 11 by a plurality of extensible upright central strut members 12 and divergent lateral strut members 13. The frame is borne by front and rear axles 14 and 15 rigidly interconnected by an elongated central brace 20. Each axle is provided with a pair of wheels 29 adapting the frame to earth traversing movement. A tow bar 21 is pivotally connected to a drag link 22 projecting from the front axle and allows towing of the scaffold by a suitable prime mover, such as a tractor, not shown.

A separate extensible strut member 12 is mounted upright on each axle 14 and 15 centrally thereof. These strut members each consist of an extensible hydraulic piston-cylinder assembly having a hollow fluid-tight cylinder body 23 in which is slidably disposed a conventional hydraulic piston, not shown. Suitable inlet and outlet ports, also not shown, are provided in the cylinder bodies. The ports are fitted with conventional flexible conduits adapted to accommodate fluid supplied under pressure, as will be described. A piston rod 24 is attached to each piston and extends slidably vertically upward out of the corresponding cylinder body. At its end there is provided an eyehole 25 for attachment to the work platforms 10 in a manner to be described. An elongated upper brace 26 interconnects the body cylinders of the upright strut members to provide rigid bracing for the upright members and for the frame 11 longitudinally of the scaffold. A pair of side diagonal members 27 provide rigid lateral bracing for each upright member. Additional longitudinal bracing for the upright strut members and the axles is provided by laterally opposite pairs of elongated rigid, diagonal braces 28.

A pair of laterally oppositely disposed extensible strut members 13, structurally similar to members 12, have their respective cylinder bodies 30 pivotally secured to the frame adjacent to the base of each of the central cylinder bodies 23, as shown at 31. Their piston rods 32 extend divergently upwardly in substantially a V relation and provide eyeholes 33 at their upper ends for attachment to the respective platforms in a manner to be described. The cylinder bodies 30 are also equipped for connection through suitable flexible conduit to a source of pressurized fluid supply, as will be described.

The hydraulic system for operating the piston-cylinder assemblies is shown schematically in FIG. 4. Each of the cylinder bodies 23 and 30 is provided with an expansion fluid-intake port, not shown, for receiving fluid under pressure incident to expanding the corresponding piston-cylinder assembly. Similarly, each cylinder body is provided with a retraction fluid-intake port, not shown, for receiving fluid under pressure incident to retracting the corresponding piston-cylinder assembly.

A flexible fluid-supply conduit 102 connects the respective expansion fluid-intake ports of one of the unilateral pairs of divergent cylinder bodies 30 in parallel and leads into a conventional three-way hydraulic control valve 103. The valve in turn leads toward the discharge end of a conventional hydraulic pump 104. The pump intake is connected to a system reservoir 105. The pump and reservoir may be mounted in any convenient location, preferably on the prime mover, not shown. Similarly, flexible conduit 106 connects the expansion fluid-intake ports of the opposite unilateral pair in parallel and leads also into control valve 103. Conduits 102 and 106 are thus in turn connected in parallel, through valve 103. By manipulating control valve 103 each unilateral pair of divergent strut members may be expanded as a separate unit or all of the divergent members may be expanded together.

A flexible fluid-supply conduit 115 connects the retraction fluid-intake ports of the upright cylinder bodies 23 in parallel and leads through a conventional control valve 116 toward the discharge end of pump 104. The parallel valved expansion fluid-supply conduits 102 and 106 are in turn connected in parallel with the retraction fluid-supply conduit 115 to lead through a conventional multi-control valve 125 to the discharge end of the pump. This will allow simultaneous retraction of the upright strut members 12 along with expansion of one, or both, pairs of the divergent strut members 13 incident to positioning of the platforms 10 for orchard work, as will be described.

In similar fashion, hydraulic conduits with appropriate control valves, shown schematically and fragmentarily at 126 in FIG. 4, allow individual retraction of a unilateral pair of divergent strut members, retraction of both pairs together or simultaneous retraction of either, or both, in conjunction wtih the expansion of the upright strut members. These movements will allow retraction of the platforms preparatory to passage between the rows of orchard trees, as will be described.

Fluid-return conduits with appropriate valves, shown schematically and fragmentarily at 127 in FIG. 4, provide for return of the hydraulic fluid to the reservoir 105 upon reversal of movement by the respective hydraulic pistons.

This description and the diagram of FIG. 4 are only intended to be schematic and not limited to any particular structural details. Conventional hydraulic circuiting techniques may provide various satisfactory equivalents to the above general hydraulic system. For instance, various combinations of multi-control valves may be utilized to allow a more compact installation and greater convenience of operation.

The control valves are located at a convenient location accessible to the operator and are mounted in battery. It may be assumed that the operator of the prime mover also operates the hydraulic system, although any of the workers may conveniently do so. The most suitable location for the control valves is either on the prime mover itself or on the end of the scaffold facing the prime mover. In FIGS. 1 and 2 the valve location is shown generally at 130.

The platforms 10 conveniently consist of a pair of congruent, substantially rectangular planar members having arcuate cutaway portions 40 equally spaced to conform to the spacing of the trees 41 along an orchard row. The platforms are disposed with their inner edges in juxtaposition and are interconnected by a common hinge 42 to allow for their simultaneous elevational pivoting.

The entire top surface of each platform 10 is preferably covered with a suitable cushioning material 50 to prevent or minimize damage to fruit 51 being deposited upon the platform surfaces. A protective fender 52 of a suitable elastomeric material, such as rubber, extends around the peripheral edges of the platforms to provide protection for the trees 41 and limbs from damage by bruising or cutting incident to inadvertent contact.

A continuous series of elongated, rectangular aligned, fruit discharge openings 53 are provided along the inner edge of one of the platforms. Mounted rigidly on the platform and aligned centrally along the row of openings is a vertical baffle plate 54, which is padded with cushioning material on both of its sides. The openings are spaced and sized so as to accommodate the free flow of fruit gravitationally discharging from the platform surfaces while at the same time allowing sufficient structural support and stability for the platform itself. On each side of the baffle plate there is sufficient passageway to allow the discharge of fruit through the opening without bridging, that is, there must be a passageway having a width at least as great as twice the diameter of the largest fruit to be accommodated.

The platforms 10 are mounted on the frame 11 by attachment of the eyehole end 25 of the central strut members 12 to the common hinge 42. Each of the lateral strut members 13 is connected to its corresponding platform by attachment of its eyehole 33 to a pivot pin supported by a rigid bracket 60 depending from the platform. The brackets on both platforms are spaced an equal distance from the common hinge and are situated so that adequate support is provided for the platform and its various loads.

The length of each of the cylinder bodies 30 of the lateral strut members 13 is such that when the piston-cylinder assemblies are fully retracted and the central strut members 12 are fully extended, as shown in FIG. 3, the platforms 10 will assume a position with their outer edges 62 extending no further laterally than the wheels 29 of the frame. Similarly, the piston rod 24 of the central strut member must be of such a length that the common hinge 42 can be raised to a height sufficient to allow the platforms to fold into the desired retracted position within the lateral limits of the wheels.

Beneath the fruit discharge openings 53 and aligned therewith along the entire length of the scaffold is a fruit conveyor 70. The conveyor may be any suitable type of fruit transferral device, such as, for instance, an endless conveyor belt 71 as shown in FIG. 3. The belt is mounted on rollers 72 in a conventional manner and is activated by means of a power source such as an electric motor 73. Cushioned guard rails 74 extend along the entire length of the belt at a distance apart sufficient to prevent bridging by the fruit. It is usually sufficient to space the walls apart at least twice the diameter of the largest fruit. Suitable padded guide flaps 75 extend below the platform opening and serve to direct the fruit falling through the opening onto the belt.

The conveyor belt rollers 72 are held in fixed position by a rigid frame which is supported beneath the platform openings 53 on vertical posts 76 mounted on the respective axles 14 and 15. The conveyor frame projecting beyond the axles is supported by means of diagonal end braces 80, as shown in FIG. 2. An apron extension 81 for the belt 71 is pivotally secured to the discharge end of the belt frame if necessary. This apron extension provides a padded passageway or a supplementary conveyor which transfers the discharged fruit into containers positioned below the platform on the ground or a following trailer, not shown.

A portable chute 85 is provided for fruit having relatively tender and easily bruised skins, such as peaches, nectarines, apricots, plums and the like. When placed in its operating position, as shown in FIGS. 1 and 3, the chute provides an upwardly opening fruit receiving portion or funnel 89, which is sufficiently padded to protect the fruit. The receiving portion curves downwardly into an arcuate duct 90 which in turn leads gradually into a rectilinear passageway 92. The passageway lies along the platform surface and leads to the discharge openings 53 of the platform. The walls 94 of the passageway are spaced apart a sufficient distance to prevent bridging. Along the length of the passageway a series of resilient retarder flaps 95 are provided in order to slow down the speed of travel of the fruit. The chute preferably has two wheels 96 to allow ease of maneuvering, handles 97 for lifting and controlling the chute, and legs 93 to give stability to the device when in use. When using the portable chute the picker can deposit the tender fruit into the opening without fear of damage to the fruit, as might occur if the fruit is deposited directly upon the platform in keeping with the preferred procedure with more hard-skinned types of fruit. Also, the worker does not have to waste movement due to frequent bending over.

Operation

The operation of the described embodiment of the subject invention is believed to be readily apparent and is briefly summarized at this point. With the platforms 10 in a retracted position, as shown at 98 in FIG. 3, the mobile scaffold is moved into position between adjacent rows of trees 41 so that the trees to be pruned, thinned or picked are disposed adjacent to the cutaway side portions 40 of the platforms. The operator then opens the expansion fluid-supply valves controlling the lateral strut members 13, the retraction fluid-supply valves of the central upright members, and the appropriate fluid-return valves. The pump 104 is then turned on and fluid under pressure is supplied to the strut members to raise the platforms into working position, as shown in FIG. 3. The cutaway portions of the platforms fit around the adjacent trees, thus providing convenient access for the workers. When the platforms are in position, the valves are shut to hold the strut members firmly in place. The electric motor 73 is activated to drive the endless conveyor belt 71 in a uniform steady movement suitable for conveying a continuous flow of fruit discharging from the platforms. The apron extension 81 is installed at the discharge end of the conveyor 70 and suitable containers for fruit are positioned at the end of the apron.

When the scaffold is ready for use, the workers climb onto the platforms 10 and commence pruning, thinning or picking fruit from the accessible portions of the trees. The platforms provide effective convenient working space for a number of workers acting in cooperation. In the picking of fruit conventional fruit sacks may be used. The sacks are secured around the waists of the pickers and are opened at their bottom ends to allow the fruit to discharge onto the platform. It is also possible for the workers to do without the conventional sacks by depositing the fruit directly upon the cushioned platforms. In either case, regardless of the relative location of the fruit on the platform, it rolls gravitationally towards the center of the two platforms where it is discharged through the platform openings 53. It then falls upon the conveyor belt 71 and is conveyed along the length of the platform to discharge into the containers. During this process the fruit is protected from damage by the padded surfaces with which it comes into contact.

In the picking of peaches, nectarines, apricots, and plums, and the like which are somewhat more susceptible to damage than other types of fruits, it has been found effective to use the padded chute 85. By use of this chute it is possible to translate the downward impetus of the dropped fruit into a transverse movement across the platforms 10 so as to avoid any damaging shock caused by the fruit falling onto the platform. As the fruit passes along the chute passageway 92, it is slowed down in its progress by the retarder flaps 95, which allow the fruit to discharge at a moderate speed so as to reach the platform openings 53 with a minimum of concussional impact.

When the trees 41 have been fully processed, the workers disembark from the scaffold, as by moving to an adjacent platform, and the appropriate hydraulic control valves are actuated to retract the platforms 10. It is apparent that through appropriate adjustment of the various valves before or during operation of the hydraulic system a high degree of synchronization can be achieved in the positioning of the platforms. Furthermore, the operator has a wide range of flexibility in accomplishing the desired platform movements. For instance, one may raise or lower one of the platforms 10 separately with or without changing the position of the upright strut members 12. On the other hand, one may adjust the position of the inner juxtaposed edges of the platforms without activating the divergent strut members 13. The platforms may be positioned in full or intermediate retracted positions, as the need requires. Retraction of the platforms serves incidentally to dump to the side all extraneous branches and other debris collected on the platforms during the tree-topping work. Consequently, it is unnecessary for the workers continually to sweep the platform. With the platforms retracted, the scaffold is moved to the next station along the row of trees. During this transition, the conveyor belt may be left running and the apron be left on, as desired. At the new station the platforms are raised as before and the cycle of work is repeated.

In view of the foregoing, it is readily apparent that the structure of the present invention has provided an improved mobile scaffold having an elevated work platform sloped to allow gravitational descent of rollable objects onto a central collection conveyor. The scaffold has an improved synchronized mechanism allowing retraction and expansion of a scaffold for ease of positioning between rows of trees.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A mobile scaffold comprising a vehicle having predetermined forward and rearward ends, a pair of substantially planar workmen support platforms; means mounting the platforms in edgewardly adjacent relation in elevated position on the vehicle for pivotal elevational movement about an axis extended longitudinally of the vehicle; powered means interconnecting the vehicle and the platforms adapted to pivot the platforms between picking position with the platforms outwardly and upwardly inclined from their axis and transport position with the platforms outwardly declined therefrom and inwardly folded for narrowed travel, said platforms having a discharge opening adjacent to the axis to which objects tend to roll when deposited on the platforms when in picking position; and an elongated conveyor mounted on the vehicle beneath the opening and extended from beneath the platforms.

2. A folding scaffold having a pair of platforms provided with laterally opposed outer edges and pivotally interconnected inner edges, said platforms being adapted for movement to and from an extended position wherein the platforms are angularly related to each other with said outer edges disposed upwardly relative to their inner edges and a retracted position wherein the platforms are angularly related to each other and said outer edges are disposed inwardly and downwardly from their extended position, the inner edges of one of the platforms providing an opening therethrough gravitationally to receive objects passing from both of the platforms; a mobile frame; first controlled powered means interconnecting the frame and said platforms at their interconnected edges, and supporting the platforms on the frame; at least one pair of elongated laterally opposed upwardly and outwardly projecting extensible struts each having one end pivotally connected to the frame and an opposite end pivotally connected to a respective platform, controlled second powered means operable to synchronize extension and retraction of said struts and to cooperate with the first powered means to raise and to lower the platforms to and from their extended and retracted positions; and object conveying means mounted on the frame beneath the platform opening.

3. A folding scaffold having a pair of platforms provided with laterally opposed outer edges and pivotally interconnected inner edges, said platforms being adapted for movement to and from a first extended position wherein the platforms are angularly related to each other with said outer edges disposed upwardly relative to their inner edges and a second retracted position wherein the platforms are angularly related to each other and said outer edges are disposed inwardly and downwardly from their extended position, the inner edge of one of the platforms providing an opening therethrough gravitationally to receive objects passing from both of the platforms; a mobile frame; an extensible hydraulic piston-cylinder assembly having a fixed support cylinder secured to the frame and an elongated piston member projecting upwardly from the cylinder, said piston member having an upper distal end connected to the pivotally interconnected inner edges of the platforms and a piston-headed opposite end constrained to a predetermined path of movement by the support cylinder; at least one pair of laterally opposed extensible hydraulic piston-cylinder assemblies each having a cylinder end pivotally connected to the frame below the platforms and an elongated piston end pivotally connected to a respective platform at a point outboard from the pivotally connected inner edges; a source of fluid pressure including control means to effect synchronized extension and retraction of the piston-cylinder assemblies while maintaining both of the laterally opposed assemblies at the same relative position of expansion and retraction and while raising and lowering the platforms; and object conveying means mounted on the frame beneath the platform opening.

4. A scaffold comprising an elongated mobile frame having a longitudinal axis and laterally opposite sides; a pair of elongated substantially congruent elevated platforms having inner edges in juxtaposition, said platforms providing an elongated opening along the length of the inner edges gravitationally to receive objects passing from both of the platforms; pivot means interconnecting the platforms adjacent to the inner edges, said platforms being adapted for movement to and from a first extended position wherein the platforms are angularly related to each other with said outer edges disposed upwardly relative to the inner edges and a second retracted position wherein the platforms are angularly related to each other and said outer edges are disposed downwardly and inwardly from their extended position; a plurality of elongated extensible hydraulic piston-cylinder lateral support assemblies each having a cylinder, a closed cylinder end, a piston internally of the cylinder with an elongated strut member projecting from the piston co-linearly externally of the cylinder and having a distal end opposite the cylinder end, said support assemblies being disposed in pairs with each pair of cylinder ends respectively pivotally connected to the frame on the laterally opposite sides of its longitudinal axis, adjacent thereto and in paired transverse alignment, said pairs being disposed in symmetrically spaced supporting relation along the length of the frame, the support assemblies in each of said pairs extending upwardly respectively divergently oppositely from each other in transverse alignment and having their upper distal ends pivotally connected to the platforms respectively at points equispaced from the inner edges; a plurality of elongated extensible hydraulic piston-cylinder central support assemblies individually structurally similar to the lateral support assemblies, one of said central support members being disposed adjacent to each pair of said lateral support assemblies in bisecting relation therewith and having its cylinder end mounted on the frame on the longitudinal axis thereof with its elongated strut member extending substantially vertically thereabove, the distal end of said strut member being pivotally connected to the platforms through the pivot means interconnecting said platforms; transversely opposed diagonal brace members respectively connecting the frame to the cylinder of each central support assembly and bracing the support assembly in its vertical position; longitudinal brace means connecting the cylinders of the central support members and supporting them in vertically braced relation; a source of fluid pressure including control means to effect synchronized extension and retraction of the piston-cylinder support assemblies and thereby to raise and to lower the platforms; and object conveying means mounted on the frame beneath the platform opening.

5. In the scaffold of claim 4 wherein the platforms have a top surface, the combination therewith of a portable chute adapted for selective positioning on one of the platforms and comprising an upwardly opening arcuate object-receiving portion, an object-discharging end, and an object passageway having a bottom disposed substantially flush with the platform surface, said passageway communicating between the object-receiving portion and the object-discharging end to effect a gradual transition in direction of movement for objects being deposited downwardly into the receiving portion gently to issue therefrom in a direction coplanar with the platform surface.

6. In the scaffold of claim 4, wherein the platforms have top surfaces, the combination therewith of a portable chute adapted to be selectively positioned on a platform to receive objects deposited therein and protectively gradually to deflect the objects in a predetermined direction substantially parallel to the platform surface, said chute comprising a rectilinear object passageway having a bottom disposed substantially flush with the platform surface; an end portion providing a discharge opening communicating with said passageway and adapted gently to discharge fruit along the platform surface; an upwardly opening object-receiving portion having an object passageway curved arcuately in substantially a vertical plane and communicating with the rectilinear passageway; handle means; wheels means mounted on the chute for positioning same on the platform with its rectilinear passageway substantially flush with the platform surface; and retarder means disposed along the object passageway adapted protectively to decelerate objects passing through the chute.

7. A mobile scaffold comprising a vehicle; a pair of substantially planar workmen support platforms; means mounting the platforms in edgewardly adjacent relation in elevated position on the vehicle for pivotal elevational movement about an axis extending longitudinally of the vehicle, said platforms being adapted to be moved between a picking position with the platforms outwardly and upwardly inclined from their axis, and a transport position with the platforms outwardly declined from their axis and inwardly folded for narrowed travel; first power means interconnecting the vehicle and the platforms at the axis and adapted to raise and to lower the axis; second power means interconnecting the frame and each of the platforms respectively at points spaced from said axis and adapted in conjunction with the first power means to move the platforms to and from their picking and transport positions, said platforms having a discharge opening adjacent to the axis to which objects tend to roll when deposited on the platforms when in picking position; and an elongated conveyor mounted on the vehicle beneath the opening and extended from beneath the platforms.

References Cited by the Examiner
UNITED STATES PATENTS

| | | | |
|---|---|---|---|
| 1,114,318 | 10/1914 | Vasey | 193—7 |
| 2,861,703 | 11/1958 | Imazimi | 214—83.1 |
| 3,129,786 | 4/1964 | Hiyama | 182—63 |

REINALDO P. MACHADO, *Primary Examiner.*